UNITED STATES PATENT OFFICE.

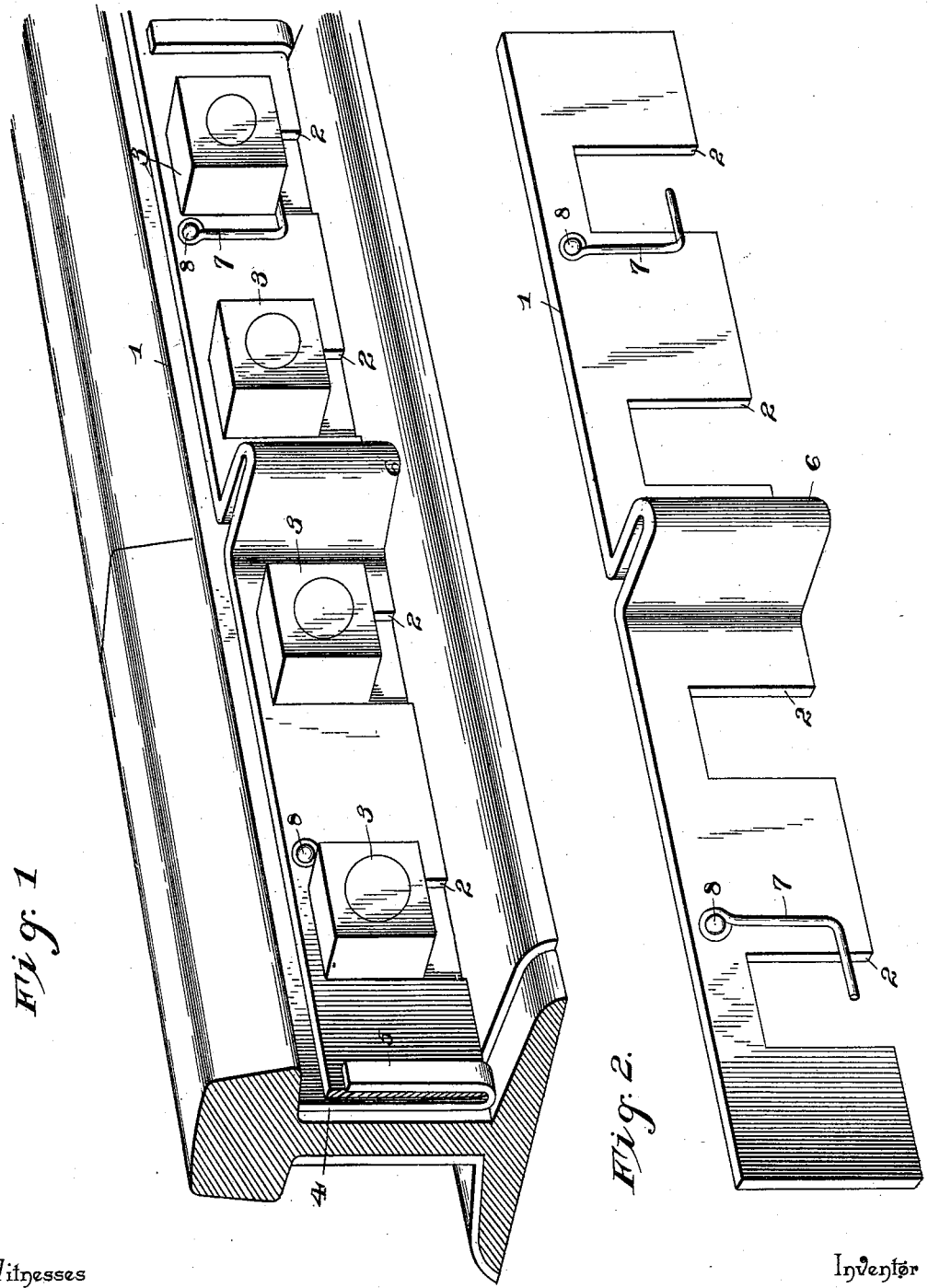

STEPHEN OLIN DOANE, OF SHERMAN, TEXAS.

NUT-LOCK.

SPECIFICATION forming part of Letters Patent No. 510,501, dated December 12, 1893.

Application filed May 19, 1893. Serial No. 474,803. (No model.)

*To all whom it may concern:*

Be it known that I, STEPHEN OLIN DOANE, a citizen of the United States, residing at Sherman, in the county of Grayson and State of Texas, have invented a new and useful Nut-Lock, of which the following is a specification.

The invention relates to improvements in nut locks.

The object of the present invention is to provide a simple, inexpensive and effective nut lock, capable of being readily applied to the nuts of a rail joint for locking them against turning, and adapted to be readily removed when desired.

The invention consists in the construction and novel combination and arrangement of parts hereinafter fully described, illustrated in the accompanying drawings and pointed out in the claims hereto appended.

In the drawings—Figure 1 is a perspective view of a nut lock constructed in accordance with this invention. Fig. 2 is a detail perspective view of the locking bar detached.

Like numerals of reference indicate corresponding parts in both figures of the drawings.

1 designates a locking plate, provided at its lower edge with nut recesses 2, and adapted to be placed over the nuts 3 of a rail joint and arranged against the adjacent fish-plate 4, as illustrated in the accompanying drawings. The nut recesses 2 are polygonal, and should conform to the configuration of the nuts; and the locking bar is placed down upon them; and its ends are arranged in loops formed by upwardly disposed flanges or strips 5, which may be formed integral with the fish-plate or be constructed separate therefrom. When the upwardly extending flanges or strips are formed integral with the fish-plate, the lower portion of the latter is severed and bent upward parallel with the upper portion of the fish-plate to form a keeper or loop for the locking-bar. The locking-bar is provided with a central vertical outward bend 6, which imparts resiliency to the sides of the locking bar and causes them to bear against the nuts 3. The locking bar is prevented from rising and becoming disengaged from the nuts and leaving the keepers or loops by L-shaped latches 7, which are arranged adjacent to the end nut recesses for engaging the end nuts of the rail-joint. The latches 7 are pivoted at their upper ends by suitable rivets or bolts 8, and depend therefrom and engage the lower edges of the end nuts.

It will be apparent that the nut lock is simple and inexpensive in construction, that it is adapted to be readily applied to the nuts of a rail joint, and that the locking plate may be readily detached and removed from the nuts when desired.

The fish-plates, bolts, nuts and rails are of the usual construction and arrangement with the exception that the fish-plate against which the locking plate is arranged is provided with the keepers or loops.

Changes in the form, proportion and the minor details of construction may be resorted to without departing from the principle or sacrificing any of the advantages of this invention.

What I claim is—

1. In a nut lock, the combination with a rail joint, of a locking bar provided with nut recesses at its lower edge to engage the nuts of the rail joint, and provided intermediate of its ends with an outward vertical bend, imparting resiliency to the sides of the locking plate and causing the same to engage the nuts, and latches pivotally mounted on the locking plate and arranged to engage nuts to prevent the locking plate rising, substantially as described.

2. In a nut lock, the combination with a rail joint having a fish-plate provided with upward extending strips forming open keepers, of a locking plate provided at its lower edge with nut recesses to engage the nuts of the rail joint and arranged in the keepers, and pivoted L-shaped latches mounted on the locking plate and engaging nuts to prevent the locking plate from rising, substantially as described.

In testimony that I claim the foregoing as my own I have hereto affixed my signature in the presence of two witnesses.

STEPHEN OLIN DOANE.

Witnesses:
W. H. HAWTHORN,
J. W. FINLEY.